United States Patent [19]

Yamamoto et al.

[11] Patent Number: 4,943,408
[45] Date of Patent: Jul. 24, 1990

[54] METHOD AND APPARATUS FOR OPERATING NUCLEAR ELECTRIC POWER GENERATING PLANTS

[75] Inventors: Fumiaki Yamamoto, Yokohama; Tsutomu Otsuka, Atsugi; Yasuo Funo, Chiba, all of Japan

[73] Assignee: Tokyo Shibaura Denki Kabushiki Kaisha, Kanagawa, Japan

[21] Appl. No.: 754,144

[22] Filed: Jul. 10, 1985

[30] Foreign Application Priority Data

May 21, 1980 [JP] Japan .................. 55-67444

[51] Int. Cl.⁵ .................................................. G21L 7/36
[52] U.S. Cl. ........................................ 376/210; 376/218; 376/241
[58] Field of Search ................... 376/210, 218, 241

[56] References Cited

U.S. PATENT DOCUMENTS

| | | | |
|---|---|---|---|
| 3,042,600 | 7/1962 | Brooks | 376/241 |
| 3,671,390 | 6/1972 | Hogle | 376/241 |
| 4,057,463 | 11/1977 | Morita | 376/241 |
| 4,222,822 | 9/1980 | Mueller et al. | 376/218 |
| 4,382,059 | 5/1983 | Doi et al. | 376/218 |

FOREIGN PATENT DOCUMENTS

| | | | |
|---|---|---|---|
| 2206234 | 8/1973 | Fed. Rep. of Germany | 376/241 |
| 54-23892 | 2/1979 | Japan | 376/218 |
| 54-36481 | 3/1979 | Japan | 376/218 |
| 54-39795 | 3/1979 | Japan | 376/218 |
| 348305 | 8/1972 | Sweden | |

*Primary Examiner*—Salvatore Gangialosi
*Attorney, Agent, or Firm*—Stevens, Davis, Miller & Mosher

[57] ABSTRACT

In a nuclear electric power generating plant connected to an electric power system, an output of a nuclear reactor of the plant is reduced during a nighttime operation, increased to a predetermined level during a daytime operation and reduced during a lunch time operation in which a poisonous effect of fission products, i.e., $X_e^{135}$ produced during a decreased output running during a nighttime operation becomes significant.

6 Claims, 13 Drawing Sheets

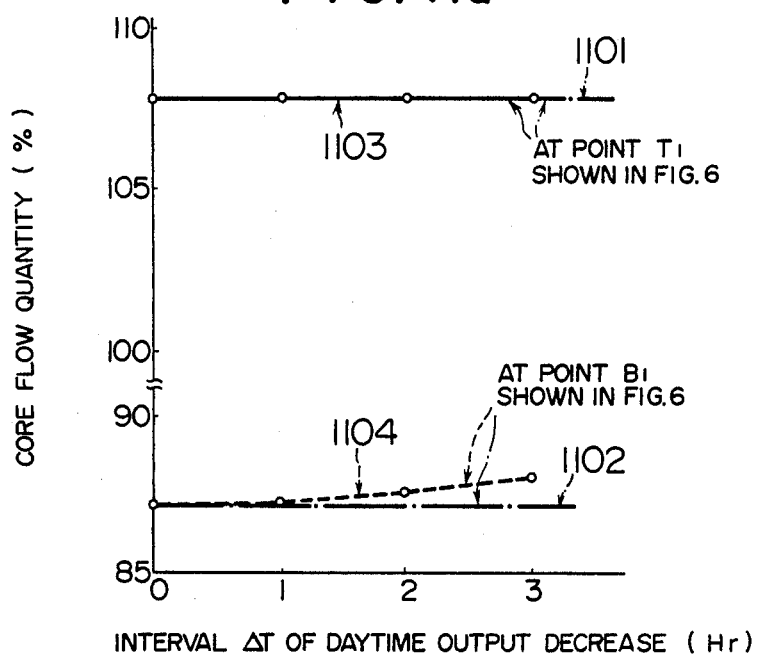
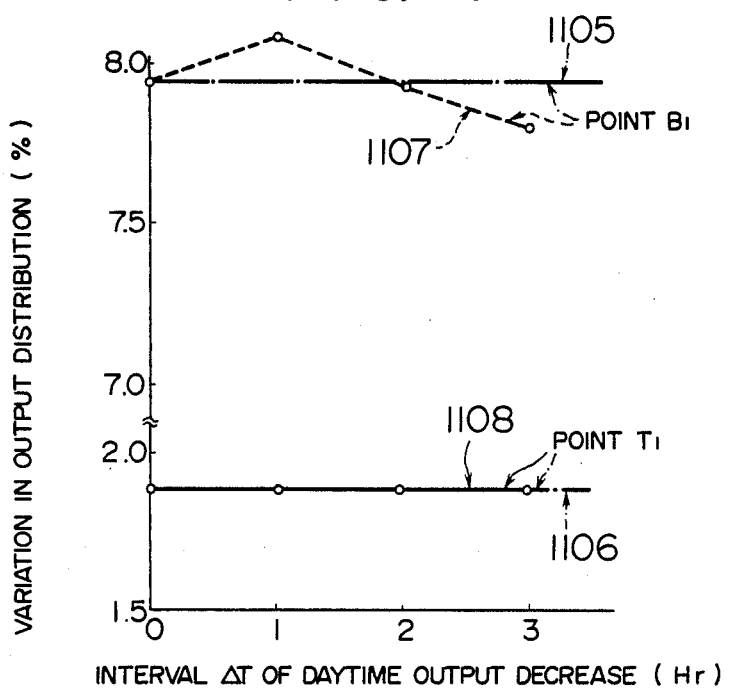

METHOD AND APPARATUS FOR OPERATING NUCLEAR ELECTRIC POWER GENERATING PLANTS

This application is a continuation of application Ser. No. 262,987, filed May 12, 1981, now abandoned.

BACKGROUND OF THE INVENTION

This invention relates to a method and apparatus for operating a nuclear electric power generating plant, and more particularly a method and apparatus for controlling the nuclear electric power generating plant to follow variation of a power demand of an electric power system, that is the output of the generator by controlling the quantity of recirculating water and by the operation of control rods of a boiling water type nuclear reactor (BWR).

At present, nuclear electric power generating plants are generally operated at their rated outputs (rated power) for the purpose of improving running efficiency in view of such factors that the percentage of the electric power generated by nuclear electric power generating plants is not so high with reference to total electric power generated by all electric power generating stations, that the cost of power generation is lower than that of steam electric power generating plants, that the outputs of nuclear electric power generating plants have not yet been controlled to follow the power demand of the electric power system, and that the rate of combustion or life of nuclear fuel varies depending upon the power output. For this reason, variation in the electric power demand has been satisfied by varying the outputs of hydroelectric and or steam electric power plants without varying the outputs of the nuclear electric power generating plants.

In recent years, however, with increase in the number of nuclear electric power generating plants as well as increase in the capacity of reactor-generator unit, the percentage of power generated by nuclear electric power generating plants has increased. Moreover, the power demand during nighttime is becoming much lower than daytime power demand with the result that it is necessary to operate nuclear electric power generating plants much more flexibly to supply power economically, reliably and stably with the entire electric power generation plants. To satisfy such requirement, should the output of a nuclear plant be reduced to 75% of its rated output in response to a large decrease in the nighttime power demand, optimum result could not be obtained in view of effective life of the nuclear fuel.

For clarifying the reason why the effective use or life of the nuclear fuel is important, the outline of a BWR generating plant and its output control in response to power demand will firstly be described as follows:

Referring to FIG. 1 which diagrammatically illustrates a BWR type nuclear reactor and a steam turbine generator set operated thereby, the reactor 5 is equipped with a core flow quantity control system 101 and a control rod control system 102. In the example shown in FIG. 1, a recirculation path includes a jet pump 105 and a recirculation pump 104 connected in a recirculation pipe 103 and the number of revolutions of the pump 4 is controlled by the core flow quantity control system 101. However, it should be understood that the quantity of recirculation can also be controlled by controlling a flow control valve, not shown connected in the pipe 103 and that the pump 104 may be disposed in the reactor 5. As is well known in the art, the control rod control system 102 controls the extent of insertion of control rods 109 (only one is shown) into fuel assemblies 108 (only one is shown) of a reactor core 107 to control the thermal output of the reactor. After passing through a water-steam separator 110 and a superheater 111, the steam generated by the reactor 5 is supplied to a steam turbine 6 for driving an electric generator 8, and the condensate in a condenser 7 is returned to the reactor 5 by a feed water pump 114.

The control of the nuclear electric power generating plant to follow up variation of the power demand can be readily and rapidly performed with the control rod control system 102 and the core flow quantity control system 101 of the type described above. The control rod control system is principally used for controlling the burn up exposure of the nuclear fuel over a relatively long time and for controlling the output to a lower output and can control the output at a rate of 3% per minute.

The core flow quantity control system 101 utilizes the characteristic of the reactor that its output is substantially proportional to the flow quantity of water through the core so that this system is used to control a large output for a short time, or to quickly control the output, and can control the reactor output at a higher rate of about 30%/min. Thus, a combination of these two control systems permits stable and quick control of the output in a range covering high and low outputs.

FIG. 2 shows the relation between the core output (ordinate) and the core flow quantity (abscissa) in which a portion 201 between points B and C shows the power-flow control line effected by the control rod while the speed of the recirculation pump 104 is maintained at a constant value. For example, while the reactor is running at point B as the control rod is inserted or extracted, the reactor output decreases or increases along line 201.

A line 202 between points A and B shows a power-flow control line when the core flow quantity is varied while maintaining a pattern of the control rods (i.e., an insertion pattern thereof in the core) at a definite pattern. For example, at point A when the core flow quantity is decreased by decreasing the number of revolutions of the recirculation pump 104 the output decreases substantially in proportion thereto and vice versa.

Thus, the power control as shown by a solid line A-B-C-B'-A' shown in FIG. 3 can be realized by controlling the output along a line A-B-C-B-A shown in FIG. 2.

In FIG. 3, solid line 301 shows a reactor output curve, while a dotted line 302 shows a reactor core flow quantity curve, both representing the relation between the output and the core flow quantity which vary with time.

Where the output is varied in a relatively narrow range of from 100 to 65%, the output can be varied rapidly as above described only with the control of the flow quantity. Although it is possible to control nuclear electric power generating plants based on this principle so as to meet variations in power demand of the electric power system, for the reason described above, at present nuclear power plants are operated at a high output for sharing a base load.

One example of the output control with the core flow quantity control will be described as follows. It should be noted that in the foregoing description the interval $\Delta t$ between points A and A' in FIG. 3 in which the output is varied is relatively short, for example, of the order of several to several tens minutes. Where this interval is lengthened to about several hours, it becomes necessary to control the reactor output to compensate for transient variation in the concentration of xenon ($X_e^{135}$) ($X_e^{135}$ transient) formed during the output variation. More particularly, when the interval is long, effect of xenon $X_e^{135}$, one of the fission products having a life time of several hours can not be neglected. Since $X_e^{135}$ has a large thermal neutron flux absorption cross-sectional area, it manifests a negative reactivity effect for the reactor output control so that in the output control this effect must be compensated for.

FIG. 4 shows one example of an output variation pattern where the effect of the transient variation of $X_e^{135}$ can not be neglected as at a week end in which a low load condition persists for about two days. In order to cause the reactor output to follow a portion 401 of the load pattern A through G, the control is effected while compensating for the negative reactivity variation of $X_e^{135}$ as shown by curve 403 in FIG. 4. Thus, it is necessary to control the core flow quantity according to curve 402 shown in FIG. 4 such that it gives a positive reactivity variation sufficient to cancel the negative reactivity variation of $X_e^{135}$ shown by curve 403.

When the variation with time of the reactor output shown by curve 401 in FIG. 4 and of the core flow quantity shown by curve 402 is represented by an output-flow quantity control diagram (power-flow control map) similar to that shown in FIG. 2, a graph shown in FIG. 5 can be obtained in which the reactor output varies along lines 501 through 504 in the order of points A, B, C, D, E, F and G.

With reference to FIGS. 6 and 7, items to be followed at the time of varying the reactor output to follow a load demand variation (load variation) will be described as follows.

FIG. 6 is a diagram showing a running region in which the abscissa represents the core flow quantity, while the ordinate the reactor output, and the running permissible region is represented by a rectangle bounded by lines 601 through 604. Curve 601 shows a permissible minimum core flow quantity, curve 602 a permissible maximum core flow quantity and curve 603 a rod block line, that is a curve limiting the extent of withdrawal of the control rods for the purpose of preventing damage of the nuclear fuel as well as excessive reactor output. Line 604 represents a permissible maximum output limit, while lines 605 and 606 represent loci (represented by points $B_1$, $T_1$, $T_1'$ and $B_1'$; and $B_2$, $T_2$, $T_2'$ and $B_2'$) of the reactor output and the core flow quantity at the time of following up the load variation. A solid line locus 605 shows one example that can be practiced because of its narrow width of output variation, while a broken line locus 606 shows one example difficult to practice because of its wide width of output variation. At running point $B_1$ the output is high and the core flow quantity is the maximum whereas at running point $T_1$, the output is high and the core flow quantity is the maximum. As will be described later, at these points, since the cooling of the nuclear fuel and the output distribution are critical it is necessary to carefully operate the reactor not to damage the fuel. It is desirable that these high output points $B_1$ and $T_2$ are sufficiently spaced from limit lines 602 through 603 (that is to have sufficient margine). Thus, like point $B_2$, any running point should not lie on the outside (to the left) of the rod block line 603. Likewise, points $T_1$ and $T_2$ should not lie on the outside of the maximum core flow quantity line 602.

FIG. 7 is a graph showing variation of the core average output distribution in the axial direction of the nuclear fuel rods in the core where the reactor output is increased or decreased at the time of a load variation follow up running. More particularly, curve 701 represents an output distribution prior to the load variation follow up running. Thus, in the core of a BWR type reactor, a nuclear thermal hydraulic phenomenon persists, and as the water utilized as a coolant flows toward upper along the fuel rods, it is gradually heated to form steam foams (voids) whereby steam-water two phase flow flows upwardly while gradually increasing the volume ratio of the voids. For this reason, at the lower portion of the core, void volume ratio is 0% but as the steam phase increases at the upper portion of the core the void volume ratio increases to about 70%. Thus, on an average, the void volume ratio of the entire core becomes to about 40%. Where the void volume ratio of the moderator is high, as the leakage of the thermal neutron flux that sustains the nuclear fission reaction is large, the output of the fuel rods decreases. At the central portion of the core, the output is large because of high density of the neutron flux generated by the fuel rods, whereas at the upper and lower portions of the core the output lowers due to high leakage of the neutron flux. For the reason described above, the axial thermal output of the fuel rods is the highest at the central portion as shown by curve 701.

In order to prevent thermal and mechanical damages of the fuel rods, especially under a high output condition, so-called preconditioning (PC) running is adopted wherein the output is gradually increased and the output distribution at this time is called a PC envelope 702. In principle, the reactor is operated within the range of this envelope, and the operation in a range outside of the PC envelope causes damage of the fuel rods, which in turn causes dangerous hazard of radioactivity.

Under the initial distribution condition, when the core flow quantity and hence the reactor output are decreased to follow up decrease in the load, the negative reactivity of $X_e^{135}$ once increases and then decreases with a time constant of about 10 hours so that the reactor output decreases and then increases correspondingly. Accordingly, in order to maintain the reactor output at a constant value, the core flow quantity is increased and then decreased to compensate for the poisonous effect of $X_e^{135}$. During this process, as at point $B_1$, there is a case wherein the output is high but the core flow quantity is small. Under this state, as the void distribution in the reactor shifts downwardly the output at the upper portion of the core decreases, whereas that at the lower portion increases correspondingly, thus manifesting an output distribution 703 $B_1$ in which a peak appears at the lower portion which exceeds initial distribution 701, thus decreasing the margin with respect to the PC envelope 702. Of course, this condition is not advantageous for the fuel. During the normal load variation follow up running in nighttime, as a result of reduction in the reactor output, the poisonous effect of $X_e^{135}$ appears at about the noon of the next day when the output is returned to a high level.

Where the reactor running is returned to the high output running from the low output running during nighttime by increasing the core flow quantity to meet the large power demand during daytime, as shown by point $T_1$- both the output and the core flow quantity become the maximum, and the output distribution of the reactor becomes so-called upper peak output distribution 704 in which an output peak appears at the upper portion of the core, the peak exceeding the initial output distribution 701 thus decreasing the margin with respect to the PC envelope 703.

Where the decrease in the power demand of the electric power system is large and persists over a long time, the locus of a characteristic showing the relation between the reactor output and the core flow quantity is shown by a curve 606 shown in FIG. 6 which drifts over a wider range than the locus 605 ($T_1$, $T_1'$, $B_1'$ and $B_1$). Accordingly, point $B_2$ may lie on the outside of the rod block line 603. The output distribution in such case is shown by a curve 703 $B_2$ shown in FIG. 7 which extends to the outside of the lower portion of the PC envelope 702, thus causing damage of the fuel rods. In addition, depending upon the load variation follow up pattern, the locus 606 might lie on the outside of limit curve 602 or 604, and its output distribution may also lie on the outside of the PC envelope 702.

As above described, when varying the reactor output to follow up load variation, it is essential to maintain the reactor output, and the core flow quantity in allowable running ranges while maintaining the output distribution below the PC envelope 702. To vary the output variation width, the output variation speed, the output decrease time, etc., corresponding to various patterns of the load variation in the power system there arises a number of strict factors that makes it difficult and complicated the load follow up running of the nuclear electric power generating plants.

The load follow up output variation pattern just described is a typical one in which under a high load during daytime, the high output is maintained, while during nighttime the low reactor output is maintained and the output is varied in the morning and evening.

Generally, a power system grid is constituted by a plurality of electric power generating stations and a plurality of grids are interconnected to constitute an extensive power network. Accordingly, where the grid or network covers a wide area the load variation during daytime and nighttime is somewhat averaged due to time difference in different districts and the load variation during day and night is alleviated due to power flow between adjacent networks or grids. However, in a small grid in a relatively small district, due to absence of a time difference, the load variation during day and night, especially near noon occurs simultaneously throughout the district. It is also necessary to compensate for the load variation caused by natural calamities or unexpected happenings and it is necessary to compensate for such load variation by controlling the outputs of the electric power generating plants in a given district. This is important because it is possible to maintain the quantity and quality (i.e., frequency) of power supply of a given grid or entire power network. Accordingly, in the following description, a medium size network is taken as an example.

In addition to the load variation during day and night, it is also necessary to take into consideration decrease of load of about 10%, based on the total load for about one to 1.5 hours during lunch time. This makes it difficult to maintain a balance between the load and the output of the power plants. To this end, it has been the practice to rapidly vary the outputs of steam and or hydroelectric power stations. Accordingly, although it is desirable to use BWR type electric power generating plants capable of rapidly varying their outputs to compensate for the load variation at the lunch time, at present, for the reason described above such requirement has not yet been realized.

SUMMARY OF THE INVENTION

It is an object of this invention to provide a method and apparatus for operating a nuclear electric power generating plant capable of alleviating poisonous effect of fission products having negative reactivity and formed during a nighttime low output running of a boiling water type nuclear plant.

Another object of this invention is to provide a novel method and apparatus for operating a nuclear electric power generating plant capable of not only decreasing damage of fuel rods but also increasing the amount and interval of reduced output running during nighttime. This not only increases utilization efficiency of hydroelectric generating plants which operate as pumping stations under a reduced nighttime power demand of an electric power system but also decreases frequent start and stop of steam electric power generating plants included in the power system thereby increasing overall flexibility of operating the electric power system.

According to one aspect of this invention there is provided a method of load variation follow up running of a nuclear electric power generating plant connected to an electric power system comprising the steps of:

decreasing an output of a nuclear reactor for driving the electric power generating plant for a predetermined interval during nighttime in accordance with a decrease in load of the electric power system; increasing the output of the nuclear reactor to a predetermined high level during daytime, and decreasing the output of the nuclear reactor for an interval during daytime in which a poisonous effect of fission products manifesting negative reactivity and produced during a decreased output running of the nuclear, reactor during the nighttime becomes substantial.

According to another aspect of this invention there is provided a load variation follow up running apparatus for a nuclear electric power generating plant including a nuclear reactor, a steam turbine driven by steam generated by the nuclear reactor, and an electric generator driven by the steam turbine, the apparatus comprises a load follow up device supplied with a load request signal from a central control station and a signal representing an output of the generator for producing a generator output control signal; a generator output control circuit connected to receive the generator output representing signal and a feedback signal of the generator for producing a turbine control signal corresponding to a difference between the two signals; and a turbine control device supplied with the turbine control signal, a signal representing a turbine speed and a signal representing a quantity of steam supplied to the steam turbine from the nuclear reactor for controlling an output of the nuclear reactor.

BRIEF DESCRIPTION OF THE DRAWINGS

In the accompanying drawings:

FIG. 9b is a graph showing the variation width in the average output distribution along fuel rods under the same condition as in FIG. 9a;

FIG. 10b is a graph showing the variation width in the average output distribution width along fuel rods under the same condition as in FIG. 10a;

FIG. 11a is a graph showing the relation between variation in the time length of daytime output decrease and variations in the maximum and minimum values of the core flow quantity under a high output condition;

FIG. 11b is a graph showing the variation width in the average output distribution width along fuel rods under a high output condition under the same condition as in FIG. 11a;

FIG. 15b shows graphs showing the core flow quantity when the lunch time load is increased as shown in FIG. 15a.

FIGS. 16a and 16b, when combined, show a flow chart for explaining the operation program of the apparatus shown in FIGS. 12 and 13.

DESCRIPTION OF THE PREFERRED EMBODIMENT

A preferred embodiment of this invention will now be described in detail with reference to the accompanying drawings.

Figure 8A:
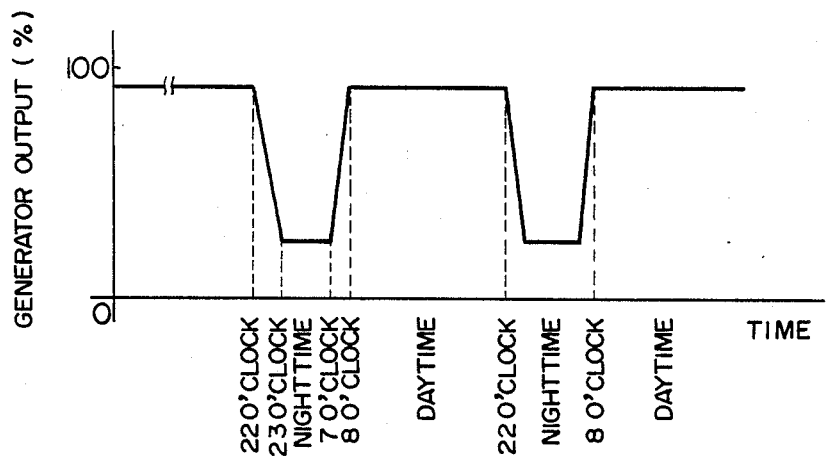
FIG. 8a shows the variation with time in the generator output according to a prior art load variation follow up operation.
Figure 8B:
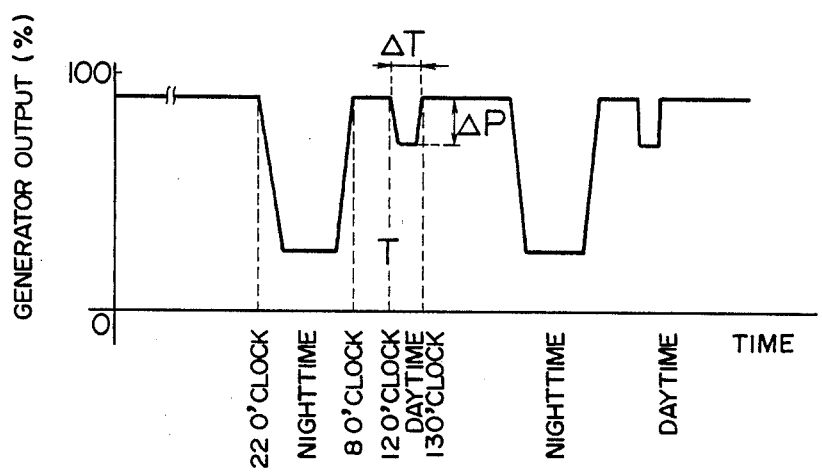
FIG. 8b shows a similar running characteristic according to this invention.

FIGS. 8a and 8b show one examples of the load variation follow up running pattern, the former showing the prior art load variation follow up running in which the output is decreased only during the nighttime. This method depends on the variation in the load during day and night in a given district. Thus, until 22 o'clock the plant is operated at substantially the rated output, low output is held between 22 o'clock and 7 o'clock the next morning, and at 8 o'clock the output is returned back to the rated output. This cycle is repeated every day. Of course, the shape of the output variation curve at the time of the load variation follow up running varies depending upon the variation in the power demand during day and night in the given district, i.e., the power system grid therein. In the following, however, the case shown in FIGS. 8a and 8b will be described as a typical example in which the load variation follow up running is relatively difficult.

FIG. 8b shows a case in which in addition to the nighttime load variation follow up running a daytime small load variation follow up running is also performed, in which T represents a time at which the small load variation follow up running starts, $\Delta T$ an interval in which the follow up running is performed, and $\Delta P$ the amount of output decrease. Although in FIG. 8b, the interval $\Delta T$ extends between 12 and 13 o'clock it should be understood that this interval may be shorter or longer than one hour.

Where the daytime small load variation follow up running is adopted in addition to the nighttime load variation follow up running, the margin of reactor output distribution with reference to the PC envelope decreases after several hours following the nighttime load variation follow up running that is at about the noon of the next day owing to the poisonous effect of $X_e^{135}$ and when the daytime small load variation follow up running is performed according to this invention the efficiency of the nighttime load variation follow up running can be improved for the reason described hereunder.

More particularly, as variations of T, $\Delta T$ and $\Delta P$ have different effects upon the nighttime load variation follow up running characteristic or efficiency the effects of improvement by different values of T, $\Delta T$ and $\Delta P$ will be discussed.

Figure 1:
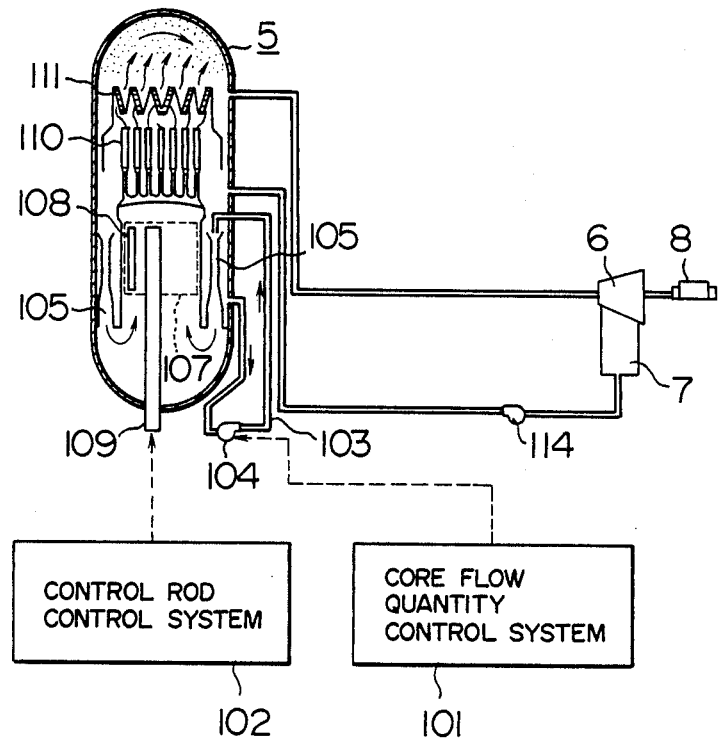
FIG. 1 is a diagrammatic representation, partly in section, of a BWR type nuclear electric power generating power plant.
Figure 2:
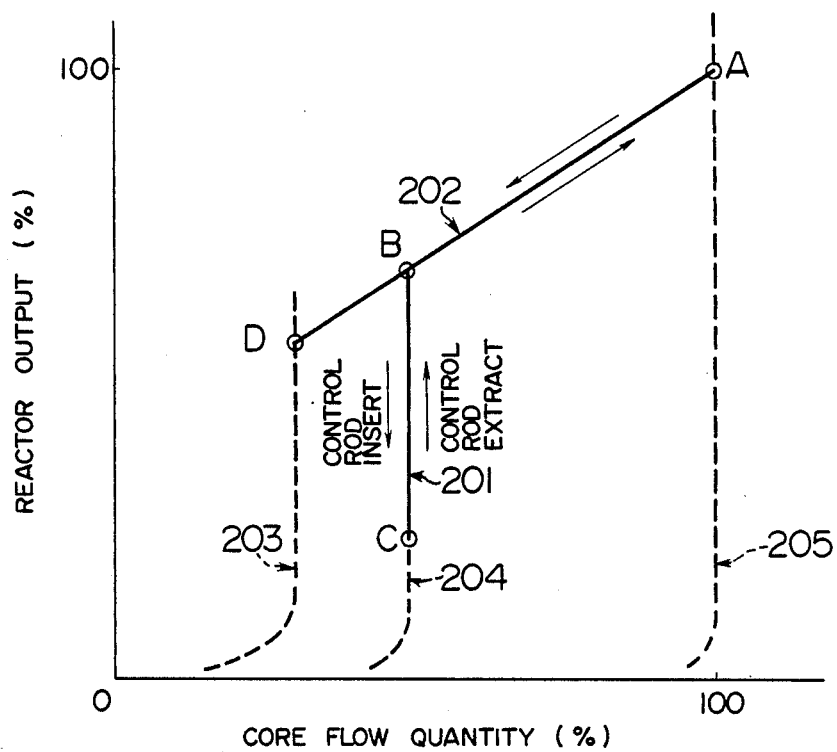
FIG. 2 is a graph showing reactor output-core flow quantity control characteristics.
Figure 3:
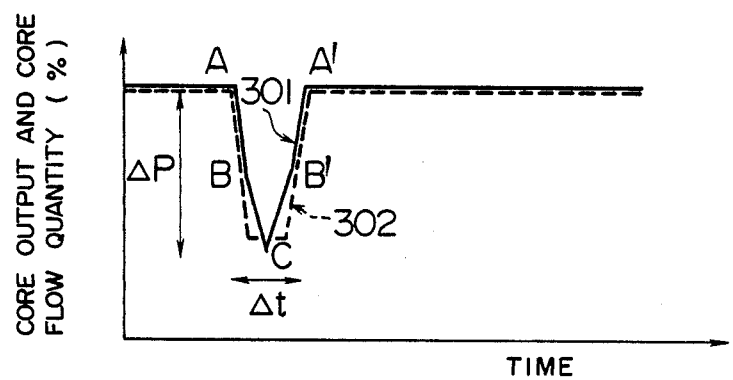
FIG. 3 shows variations with time in the reactor output and the core flow quantity.
Figure 4:
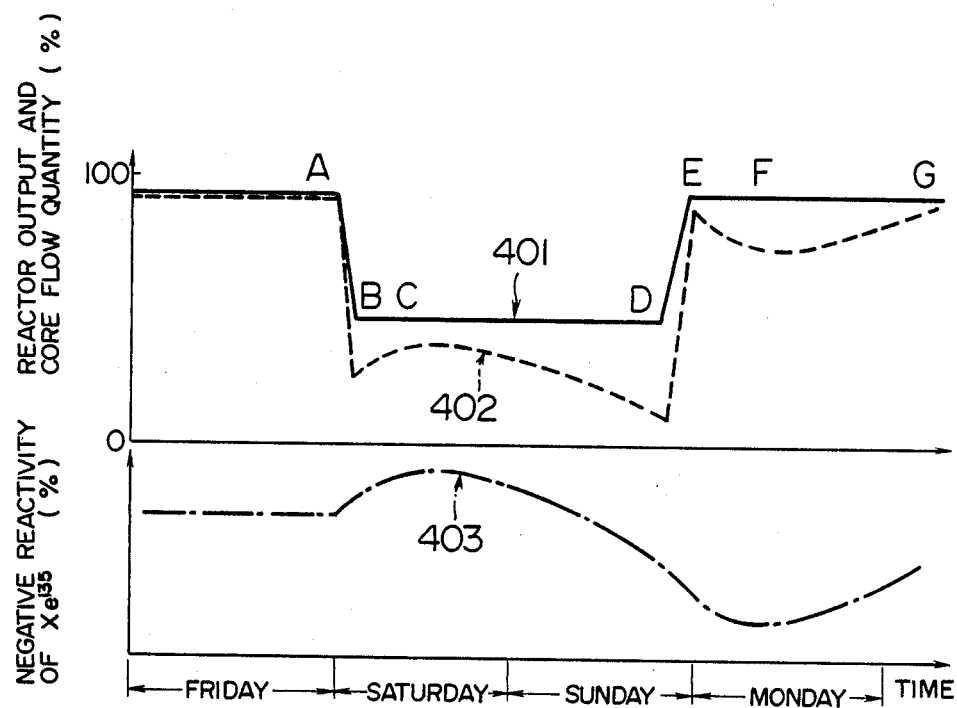
FIG. 4 is a graph showing variations in the reactor output, core flow quantity and negative reactivity characteristic of xenon during load variation follow up operation at a week end.
Figure 5:
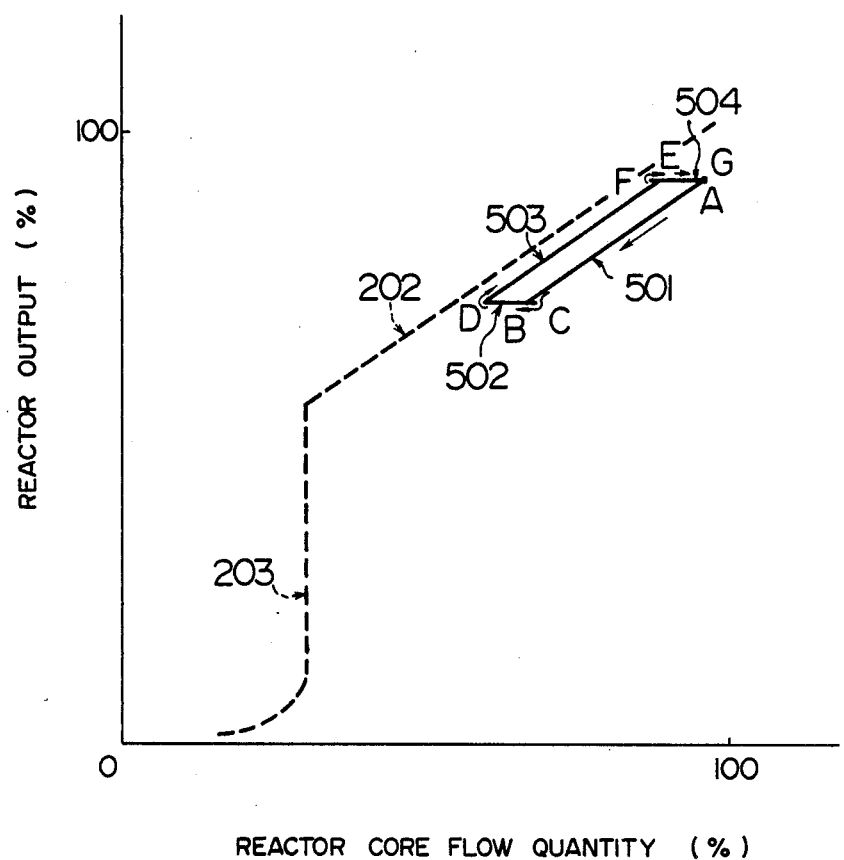
FIG. 5 is a graph showing a reactor output-core flow quantity characteristic during the load variation follow up operation at the week end.
Figure 6:
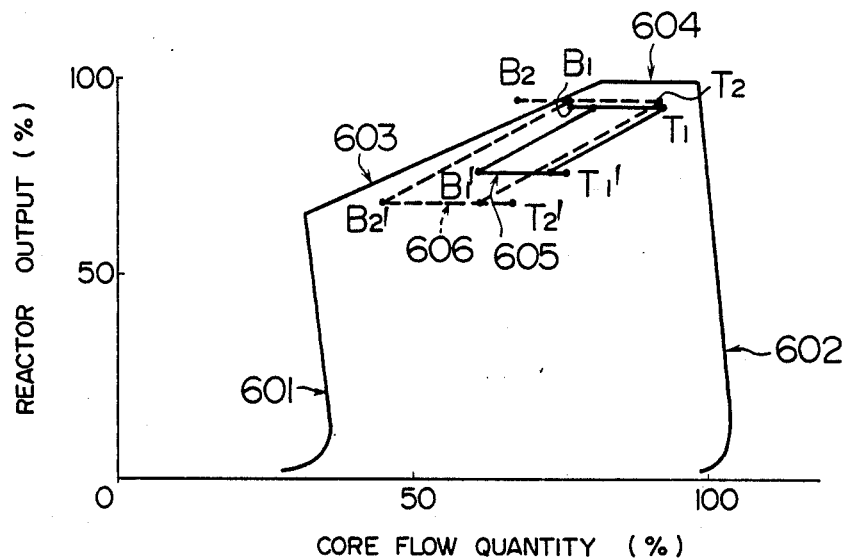
FIG. 6 is a diagram showing the allowable operating range and also a feaseable and an unfeasible operating trajectory with the ordinate representing the reactor output and the abscissa the core flow quantity.
Figure 9A:
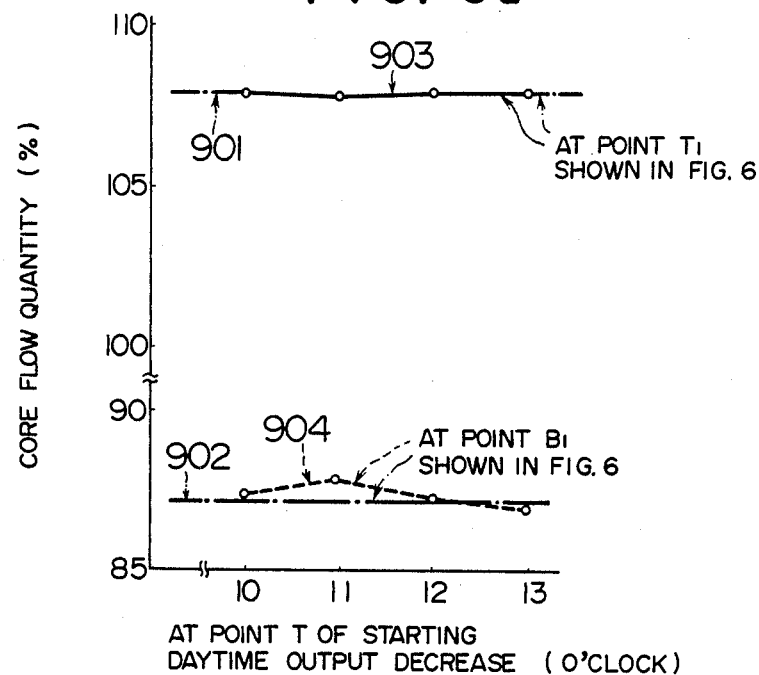
FIG. 9a is a graph showing the relation between variation in the time of starting daytime output decrease and variations in the maximum and minimum values of the core flow quantity under a high output.
Figure 9B:
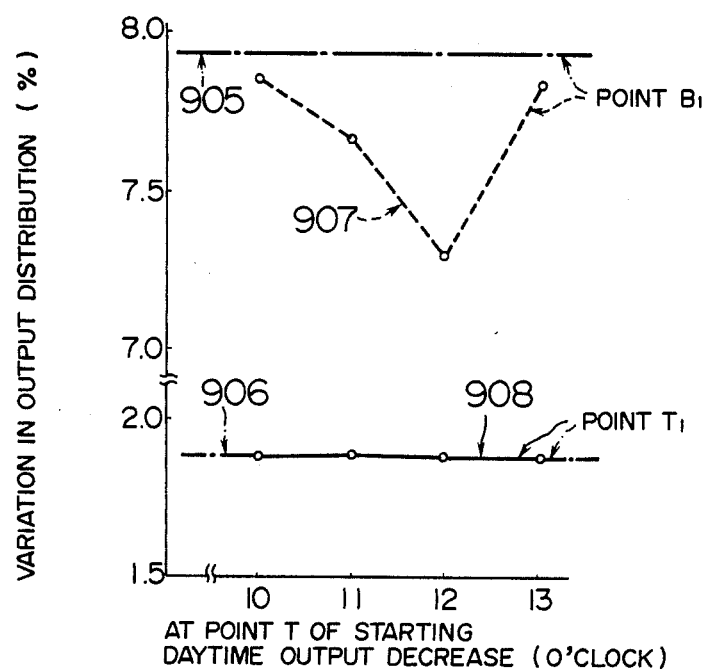

In FIG. 9a, the time T of starting daytime output decrease was varied at 10, 11, 12 and 13 o'clocks and the maximum and minimum values of the core flow quantity were calculated for evaluating the margin of the reactor output-core flow quantity characteristic in an allowable running region shown in FIG. 6, and the result was compared with that of the operation not including the daytime small load variation follow up running (hereinafter, the latter case is termed a "standard case".) Curve 903 shows a variation in the maximum value of the core flow quantity (that is the core flow quantity at a time corresponding to point $T_1$ shown in FIG. 6, and curve 901 shows that of the standard case. Curve 904 shows variation of the minimum value of the core flow quantity (that is the core flow quantity at a time corresponding to point $B_1$ shown in FIG. 6), while curve 902 that of the standard case. As curves 901 and 903 clearly show, variation of the daytime small load variation start time T as 10, 11, 12 and 13 o'clock, does not cause any appreciable variation in the maximum value of the core flow quantity. As curves 902 and 904 clearly show where the daytime small load variation follow up running is started at 11 o'clock, the variation in the minimum value of the core flow quantity 904 becomes slightly larger than the standard curve 902. In other words, the margin at point $B_1$ shown in FIG. 6 becomes a slightly larger with reference to the limit line 603 as shown in FIG. 6. When viewed macroscopically, curve 904 can be considered to be substantially equal to curve 902. In FIG. 9b, the daytime small load variation follow up start time was varied at 10, 11, 12 and 13 o'clock to detect a difference between the output distributions at the upper and lower portions of the core under a high output condition for determining the margin of the variation in the output distribution with reference to the PC envelope 702 shown in FIG. 7 and the result thus obtained was compared with that of the standard case. In FIG. 9b, curve 907 shows the variation in the lower peak from the initial variation (that is, the output distribution variation at a time corresponding to point $B_1$ shown in FIG. 6), whereas curve 905 shows that of the standard case. Curve 908 shows the variation at the upper peak from the initial distribution, that is the output distribution variation at a time corresponding to point $T_1$ shown in FIG. 6, while curve 906 shows that of the standard case. Curve 908 shows that the variation at the upper peak from the initial distribution does not vary even when the daytime small load variation follow up running starting time $T_1$ is varied at 10, 11, 12 and 13 o'clock. However, variation 907 at the lower peak from the initial distribution gradually decreases from that of the standard case 905, so that the output distribution variation at point $B_1$ shown in FIG. 6 is small which means that the margin with reference to the limit curve 702 shown in FIG. 7 increases. This also shows that it is advantageous to start the daytime small load variation follow up running at 12 o'clock.

Thus, FIGS. 9a and 9b show that even when the daytime small load variation follow up running is performed in addition to the nighttime load variation follow up running it does not degrade the margins with reference to the output-flow quantity allowable running region and the allowable output distribution than a case wherein the daytime follow up running is not made. Especially, when the daytime follow up running is started at 12 o'clock, the variation in the output distribution can be greatly improved.

Figure 10A:
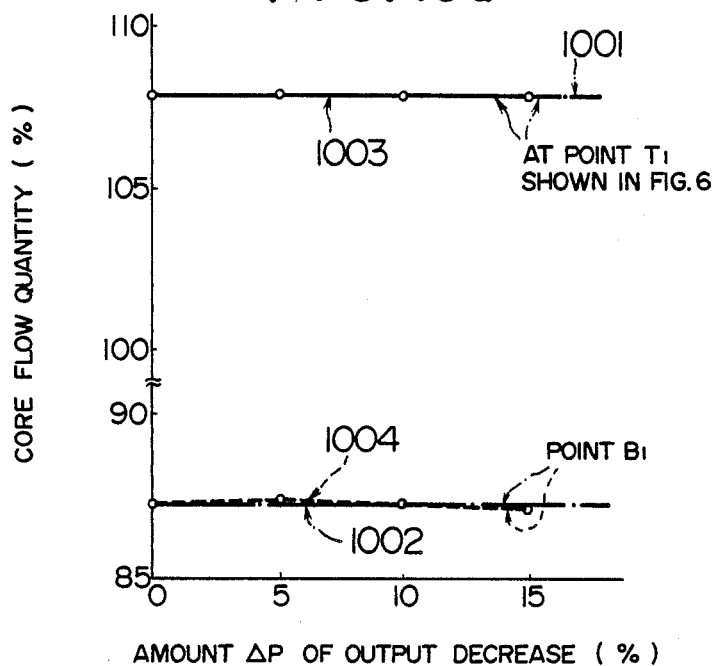
FIG. 10a is a graph showing the relation between variation in the daytime output decrease width and the variation in the maximum and minimum values of the core flow quantity under a high output condition.
Figure 10B:
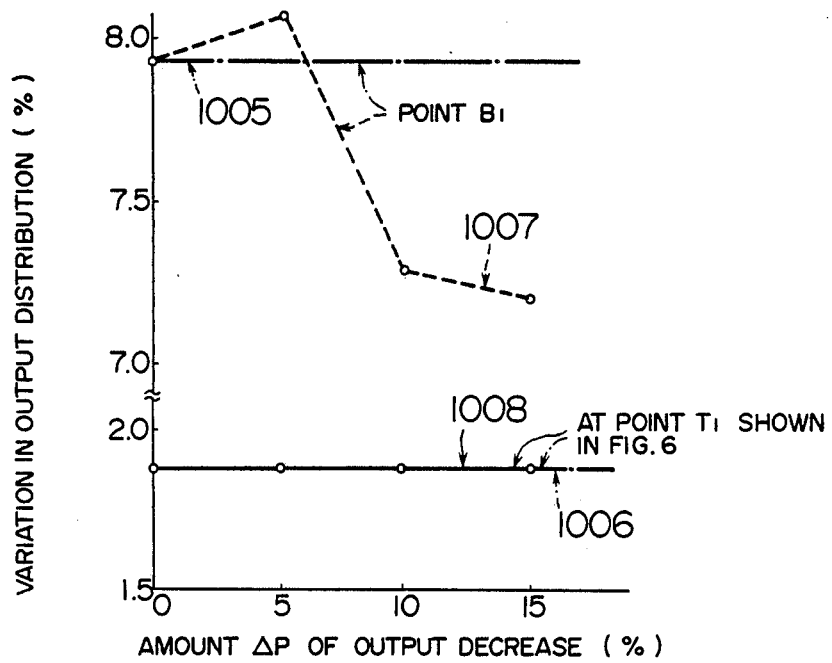

Like FIGS. 9a and 9b, FIGS. 10a and 10b show a comparison when the amount $\Delta P$ of the output is varied. In FIG. 10a, the maximum and the minimum values of the core flow quantity under high output state were calculated and compared with those of the standard case for evaluating the margin of the reactor output-core flow quantity characteristic in the running region by varying the amount of output $\Delta P$ as $-5\%$, $-10\%$ and $-15\%$ during the daytime operation between 12 and 13 o'clocks. In FIG. 10a, curve 1003 shows the variation of the maximum value of the core flow quantity, that is the core flow quantity at a time corresponding to point $T_1$ shown in FIG. 6, while curve 1001 that of the standard case. Curve 1004 shows the variation in the minimum value of the core flow quantity, that is the core flow quantity at a time corresponding to point $B_1$ shown in FIG. 6, whereas curve 1002 that of the standard case. As curve 1003 clearly shows the maximum value of the core flow quantity does not vary even when the output is varied as $-5\%$, $-10\%$ and $-15\%$ by the small load variation follow up running. The minimum value of the core flow quantity 1004 varies only slightly when the core output is reduced 5% and 15% respectively. In FIG. 10b, the daytime output between 12 and 13 o'clocks was decreased 5%, 10% and 15% respectively and for the purpose of evaluating margin of the variation of the core output distribution with reference to the PC envelope shown in FIG. 7, variations in the output distributions at the upper and lower portions of the core from the initial output distribution under a high output state was evaluated and compared with that of the standard case. Curve 1007 shows variation in the lower peak from the initial distribution at a time corresponding to point $B_1$ shown in FIG. 6, while curve 1005 that of the standard case. Curve 1008 shows variation of the upper peak from the initial distribution, that is the variation in the output distribution at a time corresponding to point $T_1$ shown in FIG. 6, while curve 1006 that of the standard case. Decrease in the output by 5%, 10% and 15% by the daytime small load variation follow up running does not result in any change in the variation 1008 of the upper portion peak from the initial distribution. However, the variation 1007 of the lower portion peak from the initial distribution is somewhat larger when the output is decreased by 5%; but when compared with the standard case 1005 although the margin of the variation in output distribution at $\Delta P = -5\%$ with respect to the limit line 702 shown in FIG. 7 decreases, the margin greatly increases when the reactor output is decreased from 5% to 15% gradually. In other words, the amount of output decrease $\Delta P$ caused by the daytime small load variation follow up running for about one hour (from 12 to 13 o'clock) performed after the nighttime load variation follow up running has a small influence upon the margin of the reactor output and the core flow quantity in a allowable running region. Thus, it can be noted that output decrease of more than about 10% greatly improves the output distribution margin.

Figure 7:
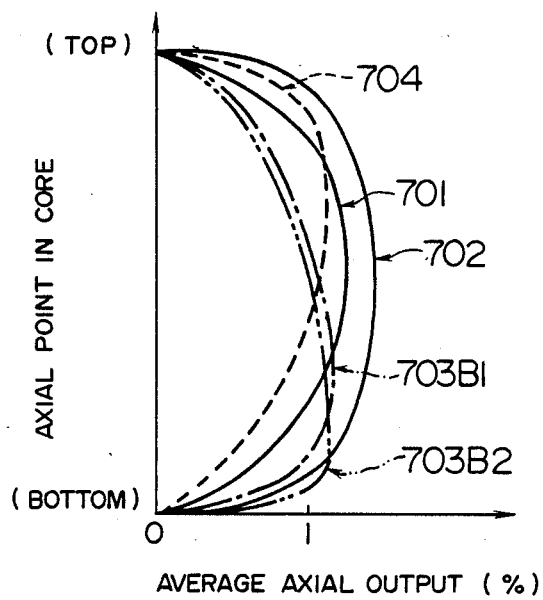
FIG. 7 shows a group of reactor output distributions in the axial direction of the fuel rods in a reactor core.

FIGS. 11a and 11b are graphs showing the relation among the maximum and minimum of the core flow quantity, variation in the output distribution and the interval $\Delta T$ in which the output is decreased in the daytime. In these figures, the interval $\Delta T$ was varied one, two and 3 hours after the noon and the amount of output decrease during the daytime was 5%, and for the purpose of evaluating the margin of the core output and the core flow quantity in the allowable running region under these conditions, the maximum and minimum values of the core flow quantity under a high output state are calculated and compared with those of the standard case. Thus, curve 1103 shows variation of the maximum value of the core flow quantity at a time corresponding to point $T_1$ shown in FIG. 6 and curve 1101 shows that of the standard case, while curve 1104 shows variation in the minimum value of the core flow quantity at a time corresponding to point $B_1$ shown in FIG. 6 and curve 1102 shows that of the standard case. Even when the interval in which the output is decreased by the daytime small load variation follow up running is varied as 1, 2 and 3 hours, the maximum value 1103 of the core flow quantity does not vary much. However, the minimum value 1104 of the core flow quantity gradually increases with time. In other words, as the output decrease interval increases, the margin with respect to the limit line 603 shown in FIG. 6 becomes larger than that 1102 of the standard case. In FIG. 11b where the daytime output decrease interval $\Delta T$ was selected to be 1, 2 and 3 hours after noon and for the purpose of evaluating the margin of the output distribution with reference to the PC envelope 702 shown in FIG. 7, the variations of the output distributions at the upper and lower portions of the core from the initial output distribution under a high output state were calculated and compared with that of the standard case. Curve 1107 shows the variation of the lower portion peak from the initial distribution at a time corresponding to point $B_1$ shown in FIG. 6, while curve 1105 shows that of the standard case. Curve 1108 shows the variation of the upper portion peak from the initial distribution at a time corresponding to point $T_1$ shown in FIG. 6, whereas curve 1106 shows that of the standard case. Even though the output decrease interval $\Delta T$ is changed as 1, 2 and 3 hours after the noon by the daytime small load variation follow up running, the variation 1108 of the upper portion peak from the initial distribution does not vary at all. However, the variation 1107 of the lower portion peak from the initial distribution is relatively large during the first one hour of the output decrease interval, that is the margin with respect to the limit curve 702 shown in FIG. 7 is smaller than that 1105 of the standard case. But during the second hour, the margin is the same as that of the standard case and during the third hour, the margin increases substantially. Thus, when the output is decreased beyond 5% after the noon, and when $\Delta T > 2$ hours, both margin with respect to the output-flow quantity allowable running region and allowable output distribution are improved than a case wherein the output decrease is not provided by the daytime small load variation follow up running. Where $0 < \Delta T < 2hr$, although the margin decreases slightly with respect to the allowable output distribution 702 shown in FIG. 7, the margin increases with respect to the allowable output distribution.

Investigation of the above described results reveals that decrease in the output during the lunch time in which the poisonous effect of $X_e{}^{135}$ formed during the nighttime load variation follow up running becomes remarkable does not make fatal problems to the nighttime load variation follow up, but rather, some factors mentioned above can be improved depending upon the adequate condition of the daytime reduced output running. Briefly stated, the daytime load variation follow up running according to this invention not only permits to respond to the daytime load variation but also to improve the nighttime load variation follow up running operation thereby enabling a load variation follow up running having such freedom as the provision of larger output variation, maintenance of a low output over a longer period, and more rapid increase and decrease in the output.

Figure 15A:
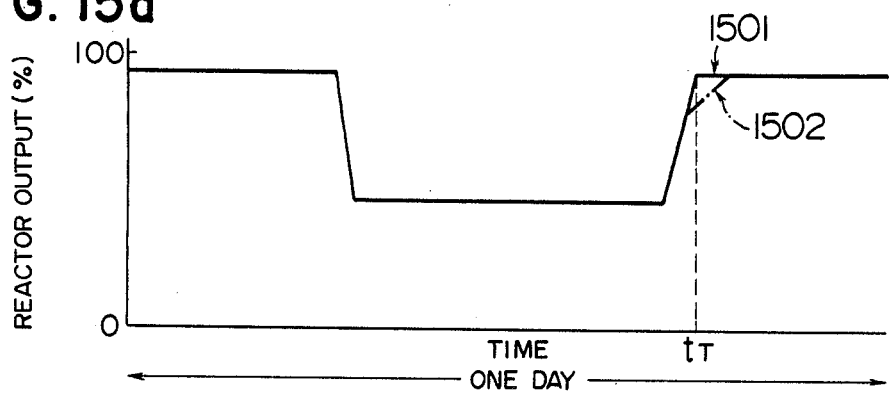
FIG. 15a is a graph showing the reactor output when the reduced load during lunch time is increased gradually.
Figure 15B:
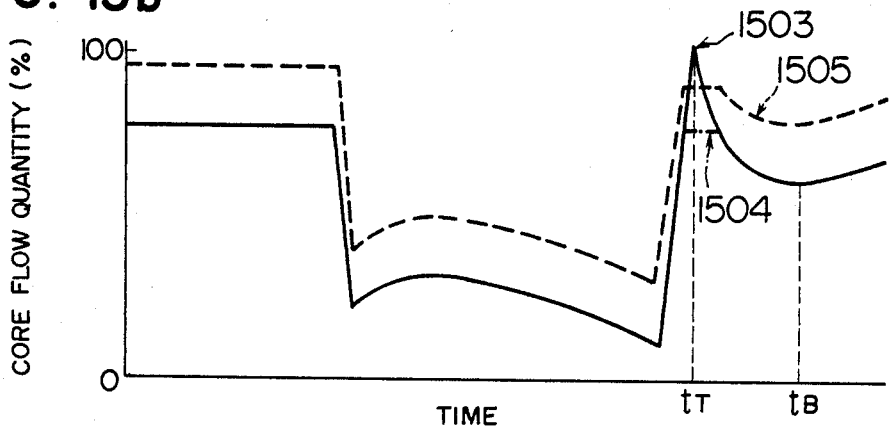

As a modified embodiment, as shown in FIG. 15a when a portion 1502 of an output variation request curve 1501 is temporarily alleviated, the light load in the daytime follow up running of this invention becomes more effective. For the sake of brevity, in FIGS. 15a through 15c load variation follow up running during nighttime is described. Curve 1503 shown in FIG. 15b shows the variation in the core flow quantity when the reactor output is varied to follow curve 1501 shown in FIG. 15a, while curve 1504 shows the variation in the core flow quantity when a modification shown by curve 1502 is adopted. Thus, curve 1504 shows the alleviation of a peak in the reactor core flow occuring at a time $t_T$. Curve 1505 shows the variation in the core flow quantity where the control rods have been inserted to increase the core flow quantity when the load follow up running is effected along curve 1502. Comparison of curves 1504 and 1505 shows that the minimum value of the reactor core flow 1505 at time $t_B$ is larger than that 1504 at time $t_B$.

Figure 15C:
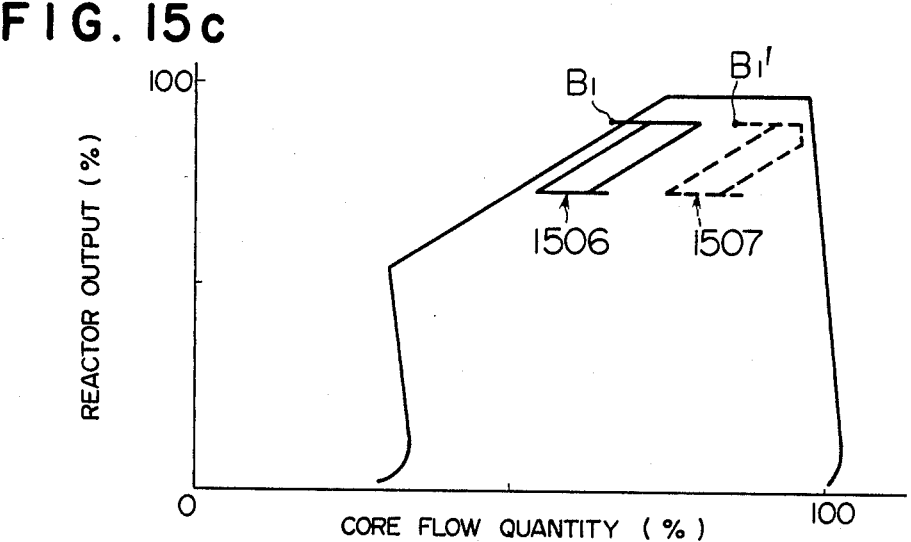
FIG. 15c shows a graph corresponding to FIG. 6 and showing the advantage of gradually increasing the reduced lunch time load.

In FIG. 15c, curve 1506 is a locus showing the variation with time of curves 1501 and 1503, whereas curve 1507 is a locus showing the variation with time of curves 1502 and 1505. As shown, curve 1507 is located on the larger flow quantity side than curve 1506 and free from any peak at the time of a large flow quantity which is shown by a dotted line in curve 1507. For this reason, it is easy to make curve 1507 to lie in the allowable running region of the reactor core flow quantity. However, as the minimum value of the core flow quantity at the time of the high output is shifted from point $B_1$ to point $B_1'$ on the larger flow quantity side, so the margin of the output-core flow quantity with respect to the limit line 603 shown in FIG. 6 becomes large and also the margin of the variation of the output distribution with respect to the limit curve 702 shown in FIG. 7 becomes large thus preventing damage of the full rods to a considerable degree.

An example of the apparatus for carrying out the method of running of this invention will now be described with reference to the block diagram shown in FIG. 12 in which a central control station 1 sends a load request signal S1A to a load variation follow up device 2 which sends a generator output control signal S8 to a generator output control device 3 to adequately control the output of the generator 8 so as to operate the nuclear reactor 5 for satisfying the load request signal S1A. Reference character S9 represents a signal supplied from generator 8 to the load variation follow up device 2 and showing the running state of the entire electric power generating plant including the generator. The generator output control device 3 calculates a difference between signal PI representing the generator output and the signal S8 to produce a difference signal P6 applied to a turbine control device 4. In response to this difference signal, a steam flow quantity signal A1 and a turbine speed signal A2, the turbine control device 4 sends a load request deviation signal A3 to the recirculation flow quantity controller 9 and a turbine control signal A4 which controls the main value MV on the steam inlet side of the turbine 6. The recirculation flow quantity controller 9 produces a control signal A4, utilized to control the flow quantity of the recirculation pump 104 so as to control the core flow quantity for varying the reactor core output. Accordingly, the quantity of steam generated in the core is controlled so as to run the generator to generate the demanded power.

The detail of the embodiment shown in FIG. 12 will now be described with reference to FIG. 13 in which the construction of the load variation change follow up device 2 is shown as a load instruction device 2' which constitutes the principal element of the follow up device 2. The load request signal S1A from the central control station 1 is inputted to a supervisory operating device 13 and then applied to a memory device 21. The operation of the supervisory control device 13 is transferred between automatic and manual operations with a switch, not shown. In the latter case, the supervisory operating device 13 produces a load request signal S1B even though the load request signal S1A is not supplied from the central control station 1, whereas in the case of the automatic operation produces the load request signal S1B corresponding to the load request signal S1A.

After being stored by the memory device 21 the load request signal S1B is applied to an anticipation device 22 preset with a simulation model of a nuclear reactor to anticipate the state thereof at the time when it is operated as requested by the load request signal S10, thus applying a load request signal S1D and a first anticipation signal S2B to a judging device 23. A second anticipation signal S2A outputted from the anticipation device 22 is applied to memory device 21 to be stored therein.

In addition to the anticipating performance the anticipating device 22 has an ability of forming a substitute pattern resembling the load request pattern. The judging device 23 judges whether the result anticipated by the anticipating device 22 damages the reactor 5 or not by comparing the anticipated result with a reference data S7 from the memory device 21. The memory device is prestored with a reference data utilized by the judging device 23 for selecting only a signal that does not damage the nuclear reactor.

When the result of judgement is NO, the judgment device 23 sends a request rejection signal S12 and a response signal S4 to the central control station 1 and concurrently transmits to the anticipation device 22 a substitute pattern request signal S3 similar to the load request signal S1D.

The request rejection signal S12 is produced in response to only the load request signal S1A from the central control station and not to the substitute pattern request signal S3.

The anticipation device 22 forms a substitute pattern by modifying the normal nighttime load variation follow up running pattern according to the width and speed of the output variation as well as the interval in which a low output is maintained and applies the substitute pattern to the judging device 23 together with the result of anticipation. The precipitated result is also applied to memory device 21 to update its memory.

Where the substitute pattern is also not adequate, new request signals are sequentially applied to the anticipation device 22 until a practical substitute pattern is obtained.

Then, the judging device 23 sends a signal S4 corresponding to the practical pattern to the supervisory operating device 13 for causing the same to send a response signal S5 to the central control station 1.

When the central control station 1 is satisfied with such substitute pattern, it applies an instruction signal S6A to the supervisory operating device 13 for requesting it to execute the substitute pattern. Then, the supervisory operating device 13 supplies a load variation follow up instruction signal S6B to the judging device 23 to cause it to send a load request signal S1E to the control device 24.

The controller 24 sends a generator output control signal S8 to the generator output control device 3 (FIG. 12) to initiate the load variation follow up running of the nuclear reactor 5.

After starting, a running state signal S9 is applied from the generator output control device 3 to a supervisor 25 to act as a feedback signal which is compared with the anticipation signal S2C obtained by the anticipation device 22 to check whether the reactor 5 is running as requested or not.

Where the result of comparison shows a large deviation, the supervisor 25 sends an abnormal running signal S11 to the supervisory operating device 13 thus informing this condition to the operator. When the result of comparison is YES, the supervisor 25 sends a normal running signal S10 to the controller 24 to continue the normal running, whereas when the result of comparison is NO, the normal running signal S10 would not be produced thus interrupting the generator output signal S8 from the controller 24.

Figure 14:
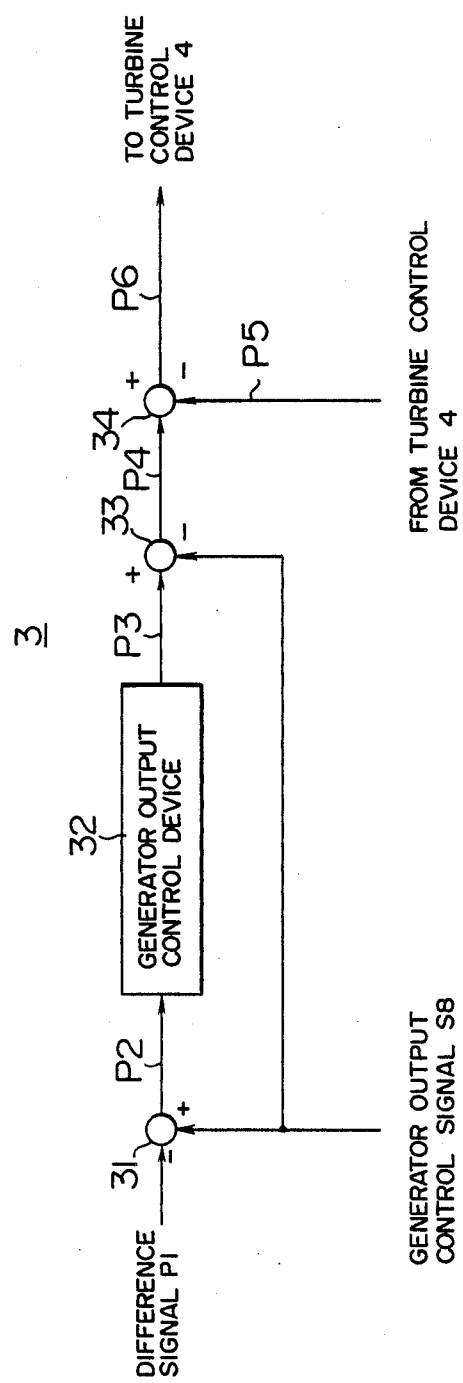
FIG. 14 is a block diagram showing a generator output control device utilized in this invention.

The generator output control device 3 utilized in this invention is shown in FIG. 14 and comprises an adder (or subtractor) 31 producing a difference signal P2 between the generator output control signal S8 and the generator output feedback signal P1, and a generator output control device 32 which in response to the difference signal P2 produces a difference signal P3, the adder 31 and the control device 32 being provided for the purpose of compensating for the time lag between the operation of the turbine control device 4 and the actual variation of the generator output.

The generator output control signal S8 is added to difference control signal P3 by an adder 33 so as to eliminate any difference between these signals under a steady state. A load setting signal P4 outputted from adder 33 is added to a feedback signal P5 from the turbine control device 4 by an adder 34 which applies an output control signal P6 to the turbine control device 4 (see FIG. 12).

Figure 12:
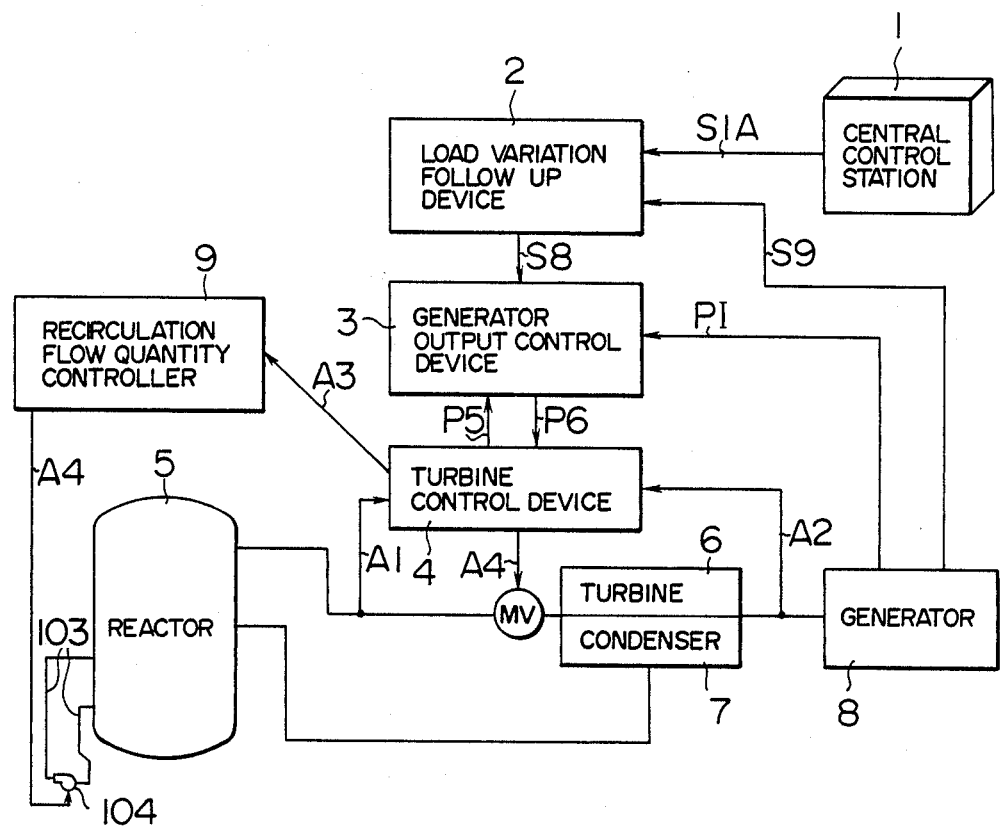
FIG. 12 is a block diagram showing one embodiment of the load variation follow up apparatus of a nuclear electric power generating plant according to this invention.
Figure 13:
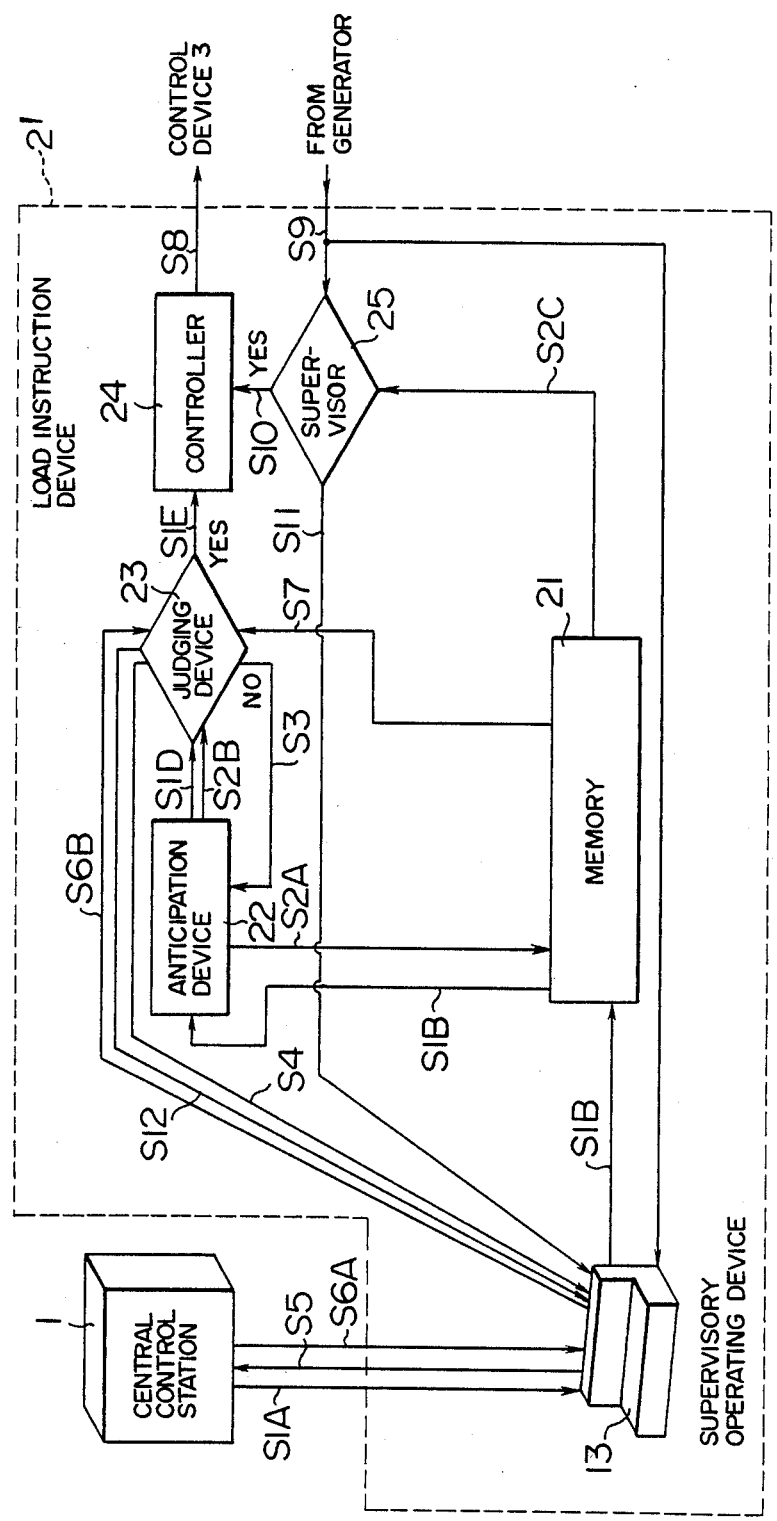
FIG. 13 is a block diagram showing the detail of the embodiment shown in FIG. 12.

FIGS. 16a and 16b show a flow chart showing an operation program of the apparatus shown in FIGS. 12 and 13. At step 1, the plant is started, at step 2, central control station 1 issues a load request signal S1A, and at step 3, supervisory operating device 13 issues a load request signal S1B to memory device 21 of load instruction device 2'. Then at step 4, memory device 21 supplies the load request signal S1B to anticipation device 22 preset with a simulation model of the nuclear reactor to anticipate the state thereof. At step 5, in response to the load request signal S1B, anticipation device 22 supplies to judging device 23 a load request signal S1D and a first anticipation signal S2B. Further, anticipation device 22 issues a second anticipation signal S2A to memory device 21. Judging device 23 is also supplied with a reference data S7 from memory device 21, and a load variation follow-up instruction signal S6B from supervisory operating device 13. At step 6 judging device 23 judges whether the result anticipated by anticipating device 22 damages reactor 5 or not. When the result of judgment is NO, judgment device 23 sends a request rejection signal S12 and a response signal S4 to supervisory operating device 13.

Supervisory operating device 13 exchanges load follow-up instruction signal S6A, response signal S5, and instruction signal SAL with central control station 5 in a manner as above described. Supervisory operating device 13 also supplies a load follow-up instruction signal S6B to judging device 23 to cause it to send a load request signal S1E to controller 24. Other portions of the flow chart shown in FIGS. 16a and 16b can readily be understood from FIGS. 16a and 16b and the description regarding FIGS. 12 and 13.

As above described, according to this invention it is possible to decrease the output of the nuclear electric power generating plant during lunch time, which improves the nighttime load variation follow up running characteristics thus enabling the nuclear electric power generating plant to follow a large load variation. This can prevent increase in the load of hydroelectric generating stations when they operate as pumping up stations during nighttime, and can prevent frequent start and stop of steam electric power generating plants. Thus, this invention can considerably improve maneuverability and reliability of the power system.

We claim:

1. A method of load variation follow up running of a nuclear electric power generating plant connected to an electric power system including a hydroelectric power generating station and a steam electric power generating station, said power system further including at least said nuclear power generating plant connected thereto, said nuclear power generating plant including a nuclear reactor which is operated during first and second successive time intervals which together form a 24-hour day, said first interval including a period of a day when a demand load on said power system is at a highest demand load level during said 24-hour day and said second interval including a period of a day when a demand load on said power system is at a lowest demand load level during said 24-hour day, said method comprising the steps of:

(a) operating said nuclear reactor for driving said nuclear electric power generating plant at a first output level during a said first interval of a given 24-hour day;

(b) decreasing an output of said nuclear reactor from said first output level to a second output level during a said second interval of said given 24-hour day occurring during a period when there is a decrease in demand load on said power system from said highest demand load;

(c) increasing an output level of said nuclear reactor toward said first output level thereof during a said first interval of a next 24-hour day following said second interval of said given 24-hour day;

(d) temporarily decreasing an output of said nuclear reactor during a third interval of said given 24-hour day which is included within said first interval of said given 24-hour day, said third interval of said given 24-hour day occurring when a poisonous effect of fission products manifesting negative reactivity which is produced by a decreased output running of said nuclear reactor during step (b) becomes substantial; and (e) increasing at least one of an amount and a duration of said decreased output running of said nuclear reactor during said second interval of said given 24-hour day in accordance with a decrease in an output of said nuclear reactor during an operation of said reactor during said third interval of said given 24-hour day.

2. The method according to claim 1 wherein said fission products comprise $X_e^{135}$.

3. The method according to claim 1 wherein when increasing the output of said nuclear reactor toward said first output level, the reactor output is increased relatively slowly.

4. In a nuclear electric power generation plant including a nuclear reactor, a team turbine driven by steam generated by the nuclear reactor, and an electric generator driven by said steam turbine, said generator being connected to an electric power system including a hydroelectric power generating station and a steam electric power generating station, a load variation follow up running apparatus comprising:

a load variation follow up device supplied with a load request signal from a central control station and a signal representing an output of said generator for producing a generator output control signal;

a generator output control circuit connected to receive said generator output representing signal and a feedback signal of said generator for producing a turbine control signal corresponding to a difference between said two signals; and a turbine control device supplied with said turbine control signal, a signal representing a turbine speed and a signal representing a quantity of steam supplied to said steam turbine from said nuclear reactor for generating a signal for controlling an output of said nuclear reactor in order to control a quantity of steam admitted into said turbine.

5. The apparatus according to claim 4 wherein said nuclear reactor is of the boiling water type provided with pump means for recirculating water through a core of said nuclear reactor and wherein said signal generated by said turbine control device controls said pump means.

6. The apparatus according to claim 4 wherein said load variation follow up device comprises a supervisory operating device connected to said central control station, comparator means, supervisory means, an anticipating device preset with a predetermined operating pattern of said nuclear reactor and supplied with a load request signal from said supervisory means for applying a reference signal to said comparator means and for forming a substitution pattern similar to a requested load pattern, said comprator means comparing said reference signal with a result of anticipation executed by said anticipating means and when a result of comparison is not feasible requesting said substitute pattern, and wherein said load variation follow up device further comprises a controller connected to receive outputs of said comparator means and said supervisory means for applying a signal to said generator output control device.

* * * * *